United States Patent [19]

Hoffberg

[11] Patent Number: 5,963,957
[45] Date of Patent: Oct. 5, 1999

[54] BIBLIOGRAPHIC MUSIC DATA BASE WITH NORMALIZED MUSICAL THEMES

[75] Inventor: Mark B. Hoffberg, Palo Alto, Calif.

[73] Assignee: Philips Electronics North America Corporation, New York, N.Y.

[21] Appl. No.: 08/840,356

[22] Filed: Apr. 28, 1997

[51] Int. Cl.⁶ .................................................. G06F 17/30
[52] U.S. Cl. ............................. 707/104; 707/4; 707/102
[58] Field of Search .................... 707/1, 104, 4, 707/100, 102; 84/609, 611

[56] References Cited

U.S. PATENT DOCUMENTS

| | | | |
|---|---|---|---|
| 4,945,804 | 8/1990 | Farrand | 84/462 |
| 5,375,501 | 12/1994 | Okauda | 84/611 |
| 5,402,339 | 3/1995 | Nakashima et al. | 707/1 |
| 5,451,709 | 9/1995 | Minamitaka | 84/609 |
| 5,535,300 | 7/1996 | Hall, II et al. | 704/227 |
| 5,616,876 | 4/1997 | Cluts | 84/609 |
| 5,728,960 | 3/1998 | Sitrick | 84/477 R |
| 5,769,269 | 6/1998 | Peters | 221/7 |
| 5,808,223 | 9/1998 | Kurakake et al. | 84/600 |

FOREIGN PATENT DOCUMENTS

| | | | |
|---|---|---|---|
| 0766225A1 | 4/1997 | European Pat. Off. | G10H 1/00 |
| 08123818 | 5/1996 | Japan | G06F 17/30 |
| 09293083 | 11/1997 | Japan | G06F 17/30 |

*Primary Examiner*—Wayne Amsbury
*Assistant Examiner*—Cheryl Lewis
*Attorney, Agent, or Firm*—Peter Verdonk

[57] ABSTRACT

An information processing system has a music data base. The music data base stores homophonic reference sequences of music notes. The reference sequences are all normalized to the same scale degree so that they can be stored lexicographically. Upon finding a match between a string of input music notes and a particular reference sequence through an N-ary query, the system provides bibliographic information associated with the matching reference sequence.

16 Claims, 2 Drawing Sheets

BIBLIOGRAPHIC MUSIC DATA BASE WITH NORMALIZED MUSICAL THEMES

FIELD OF THE INVENTION

The invention relates to an information processing system for interacting with a music data base, to a method of operating a music data base, and to a memory module with a music data base.

BACKGROUND ART

U.S. Pat. No. 5,402,339 discloses a system for creating a music data base of musical information that can be processed by a computer and for retrieving a string of note data items from the music data base.

The known system comprises an input converter that converts music data supplied by an electronic device into note data items. The electronic device that supplies the music data is a computer, an electrical musical instrument, a music sampler or a reproducing device. Each note data item represents a time period and a scale degree of a sound identified by a single musical note. Both period and scale degree have digital values. The system further comprises a position information unit for producing position data items that specify the relative position in a sequence of the note data items in the piece of music represented by the music data. The note data items and position data items are stored together with an index table that links the data note items, the position data items, and the number of times a specific data note item occurs in the piece of music thus stored.

The known system comprises means to retrieve a particular piece of stored music. Music information is supplied to the system as a string of note data items and associated position data items. A particular seek algorithm is employed to find a match between the string and a particular piece of music. The algorithm uses a histogram for each theme specifying the number of times a particular note occurs in this theme. The query for a matching theme is then facilitated by focusing on the rarest notes as the characterizing elements of the theme.

OBJECT OF THE INVENTION

The known system reproduces a piece of music stored upon finding a match between the stored piece and an entered string of musical notes. The known system processes note data items in a range that extend from the lowest to the highest musical notes audible (including flat and sharp) in order to cover all possible musical themes. That is, the note data items should be encoded as digital words wide enough to cover the range. As a consequence, memory capacity must be large enough to store these wide words. Further, the absolute magnitude of the pitch, or scale degree, of every note entered in the query must be accurate enough in order to match the one stored. The retrieval algorithm used is rather complicated in that it requires the storage and creation of note data items, position data items, index tables and histograms to control access to any sequence of note data items stored. The algorithm requires a histogram of each piece of music to keep track of how many times a given note occurs in a given sequence of notes stored, this number of times being a retrieval key.

It is an object of the invention to provide an alternative kind of information processing system having a music data base.

SUMMARY OF THE INVENTION

To this end, the invention provides an information processing system that comprises first memory means storing a data base having respective bibliographic information items corresponding with respective ones of multiple musical themes. The system further comprises second memory means for storing respective reference data representing respective reference sequences of reference musical components of respective ones of the musical themes. The system has an input for receiving an input data representative of an input sequence of input musical components, and retrieval means coupled to the input and to the first and second memory means for providing a particular bibliographic information item upon finding a match between a particular one of multiple reference data and the input data.

In a particular embodiment, each respective one of the input musical components comprises a respective input musical note, and each respective one of the reference musical components comprises a respective reference musical note.

The system of the invention associates an entered sequence of notes with one or more bibliographic information items upon finding a match with a stored sequence of notes. The bibliographic information item may include, for example, the name and biography of the composer, the name of the text writer, the lyrics, the title of the album, context information about the theme, related works. A MIDI file of the melody from which the reference sequence is a sample, or a recording of the actual performance, a video clip, etc, could be provided as well.

A musical theme as represented by a single sequence of notes is, by definition, homophonic. Typically, a musical theme within this context is a line of music that people find easy to remember, e.g., DA-DA-DA-$_{DUMMM}$ (Beethoven's Fifth Symphony), and DA-DAAA-$_{da}$-da-$^{daa}$-$_{da}$-da-$^{daa}$-$_{da}$-da-$^{da}$-DA-DAA ('Jumping Jack Flash', Rolling Stones), etc. As another example, a musical theme easily remembered is the first couple of bars of a song or of a chorus (national anthems) or another dominant portion, or the theme is associated with a catching line of the lyrics (e.g., Andrew Lloyd Webber's rock opera's) or with an impressive riff (e.g., Keith Richards on guitar).

The invention is especially of interest to record shops. Customers can retrieve in this manner the information about a musical theme, of which they have only remembered a couple of bars. Heretofore, clients had to rely on the expertise of the staff of the shop. The invention is also of interest to organizations like ASCAP (American Society of Composers, Authors and Publishers) whose function it is to protect the rights of composers, songwriters, lyricists and music publishers by licensing and negotiating royalties for the public performances of the copyrighted works of their members.

It is another object of the invention to enable fast and orderly identification of a given piece of music in a user-friendly manner using simplified hardware and software. It is a further object to provide a system that requires less storage space for the storage of musical notes. To this end, a preferred embodiment of the invention is characterized in that the multiple musical themes as represented by the reference sequences are uniformly normalized with regard to one and the same predetermined scale degree.

This aspect of the invention is based on the following insight. One and the same musical theme can be represented by an infinite number of note sequences. The ratio between the frequencies of the scale degrees of successive notes stays invariant in each such representation, but the frequency of a particular note can have any value. That is, the recognizability of a theme is substantially invariant under a gauge transformation that shifts the frequency of all notes of the sequence by the same fixed amount. Once the frequency of a particular note in the theme has been chosen, the absolute pitch of any other note in the same theme is fixed under this constraint. In the data base of the invention, the themes are normalized with regard to the one and the same scale degree. For example, the first note of each reference sequence as stored is always of the same pitch, e.g., 220 cps. Alternatively, the first note of each reference sequence as stored is always such that if it were preceded by another note of the same theme, this preceding virtual note would have always the same pitch, uniform for all themes. This is a unique identification of the succeeding note, i.e., the first note in the reference sequence as stored, since the musical themes are known in advance.

This normalization reduces the width required of the words to represent the scale degrees in digital format as compared to the cited prior art. The scale degrees of the homophonic representation of the majority of the musical themes do not span more than two or three octaves. In the invention all themes are normalized to these two or three octaves. The memory for the reference sequences stores and routes much shorter words than in the prior art cited above.

The input sequence is normalized with regard to the same scale degree as well in order to carry out the query. The input data represents an input sequence of input musical notes. The input data is provided through some appropriate interface. For example, a simple keyboard is used. Alternatively, the user hums the part of the tune into a microphone. If necessary, the user can employ a tuning fork of the appropriate pitch, or the system has means to generate a sound of this pitch, that helps the user to catch at least the first few notes. If necessary, filtering and quantization techniques are applied to extract from the tune, hummed or entered in another way, the appropriate notes for further processing.

In still another embodiment, the input sequence of input notes and the reference sequences of reference notes are represented as series of ratios between pairs of successive scale degrees. In this manner, the absolute scale degree of the first note, used as a direction in the previous embodiment, is not required anymore.

According to another aspect of the invention, scale degrees or ratios of pairs of successive scale degrees are mapped onto an ordered set, e.g., onto that of the integers. The mapping per scale degree or ratio onto an element of an ordered set allows for lexicographic ordering of the reference data and the usage of a simple search strategy, e.g., an N-ary search strategy similar to that for a dictionary.

Assume that the input data is a sequence of musical notes, entered through a keyboard or hummed into a microphone. A further advantage of the lexicographic ordering is then that the query continues while the individual notes are being entered one after the other. Each next one of the notes successively decreases the number of candidate reference sequences, owing to the lexicographic ordering.

Alternatively, or supplementarily, the input data comprises rhythm information about a musical theme. The rhythm information comprises the time signature (meter) and the accentuations of the theme. The time signature determines the number of beats to the measure. The accentuation determines which beat gets an accent and which one does not. For example, the sign $^6_8$ in a musical score is the time signature indicating that the meter is 6 beats to the measure and that an eighth note gets one beat. Flamenco music has a variety of different styles, each determined by its own compàs (rhythmic accentuation pattern). Typical examples of flamenco music are Alegrias, Bulerìas, Siguiriyas and Soleares that all have 12 beats to the measure. In the Alegrias, Bulerias and Soleares, the third, sixth, eighth, tenth and twelfth beats are accentuated. The first, third, fifth, eighth and eleventh beats are emphasized in the Siguiriyas style.

In the invention, rhythmic accentuation patterns are used as input data in order to retrieve bibliographic information. For example, the user enters the rhythmic accentuation pattern into the system as a substantially monotonic sequence of accentuated and unaccentuated sounds through, e.g., humming into a microphone or manipulating a particular key of a keyboard, or drumming the rhythm with his or her fingers. The input data then is represented by, e.g., a sequence of beats or peaks of varying height in the time domain. The relative distances between successive peaks represent the temporal aspects of the pattern and the relative heights represent the accentuations in the pattern. The sequence of beats and rests in between is represented by a digital word. The words can again be stored lexicographically to enable a fast and orderly retrieval.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

System

Figure 1:
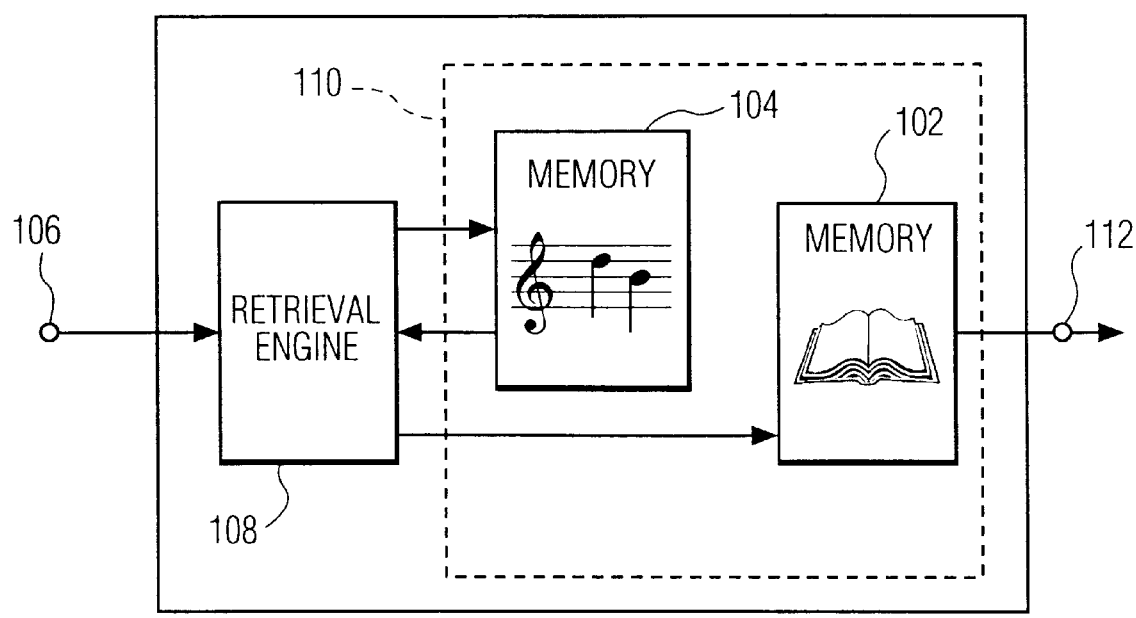
FIG. 1 is a diagram of an information processing system according the invention.

FIG. 1 is a block diagram of a system 100 according to the invention. System 100 comprises a first memory 102 storing a data base. The data base has respective bibliographic information items corresponding with respective ones of multiple musical themes. System 100 has a second memory 104 for storing respective reference data representing respective reference sequences of musical notes of respective ones of the musical themes. System 100 has an input 106 for receiving an input data representative of an input sequence of input musical notes. System 100 further has a retrieval engine 108 coupled to input 106 and to first and second memories 102 and 104. Retrieval engine 108 provides a particular bibliographic information item at an output 112 upon a match between a particular one of multiple reference data and the input data. For example, each reference data in memory 104 has a pointer to an associated bibliographic information item stored in memory 102. Upon a match between the input data supplied via input 106 and a specific one of the reference data in memory 104, the corresponding pointer identifies the associated bibliographic information item in memory 102.

Memories 102 and 104 in this example are combined in a memory module 110 such as an optical memory (e.g., a CD, or a DVD) or a solid-state memory. Module 110 is physically detachable from retrieval engine 108. In this manner, system 100 can be provided with different modules for different categories of music (e.g., symphonies, jazz, rock, folk) or for different kinds of bibliographic information (e.g., lyrics, biographies of composers).

In an alternative embodiment, memory means 102 and 104 are stored at a server. The browser software is provided by retrieval means 108. The user is enabled to transmit his input data to the server and receives the appropriate category of bibliographic information if there is match.

Lexicographically organized data base

The multiple musical themes as stored in memory 104 and as represented by the reference sequences are uniformly normalized with regard to one and the same predetermined scale degree. The first note of each reference sequence as stored is always of the same pitch, e.g., 220 cps. Alternatively, the first note of each reference sequence as stored in memory 104 is always such that, if it were preceded by another note of the same theme, this preceding virtual note would have always the same pitch uniform for all themes. This is a unique identification of the succeeding note, i.e., the first note in the reference sequence, since the musical themes are known in advance. The input sequence is normalized as well with regard to the same scale degree in order to carry out the query.

Each respective one of the reference data comprises a respective ordered set of elements. A position of a specific element and a value of the specific element in the respective ordered set are determined by a position and scale degree of a specific one of the musical notes in the respective reference sequence. For example, each note, middle, or with an associated sharp, or with an associated flat, is represented in a data format that identifies its linear position in an octave and that identifies the linear position of the octave within the range of octaves covered by the musical themes in the data base. Alternatively, each note is assigned one of the integers in the range from 1 to K. In still another embodiment, the ratios of successive scale degrees in a sequence are elements in an ordered set. In these manners, sequences of notes or ratios are mapped onto an ordered set of elements. These ordered sets are then lexicographically arranged in the data base. Comparison between the input data and the reference data then proceeds lexicographically, i.e., in the same way as looking up a word in a dictionary, for example, according to an N-ary tree search strategy.

A tree within this context is an ordered set of components wherein each component has exactly one predecessor and each component has at the most a number of N direct successors. A dictionary of, e.g., the English language, orders words as finite sets of, say, L letters at the most. Each of the L letters assumes one of twenty-six possible values. Words that have as a first letter the letter "a" come before words with a first letter "b", and words that begin with the letter "c" come after the "b"-words. Within the category of the "a"-words, words that have as a second letter the letter "b" are arranged after those that have as the second letter the letter "a", etc. That is, given the j-th letter of a word, there are at most twenty-six direct successors determined by the values of the (j+1)-th letter. Accordingly, looking up a particular word, say: "hello", in a lexicon proceeds as follows. First, the letter at the begin of the word is determined. This is an "h" in the word "hello". One proceeds to the chapter of words starting with an "h". Then, the second letter is determined. Assume this is an "e". One then proceeds to the sub-category of words in the "h"-chapter that start with "he", and so on. Note that each next step requires making a selection out of at the most twenty-six possibilities. A similar search strategy is adopted for the purpose of finding a match between the particular input sequence and one of the reference sequences of notes on the chromatic scale in music (the scale with twelve half tones to the octave).

Figure 2:
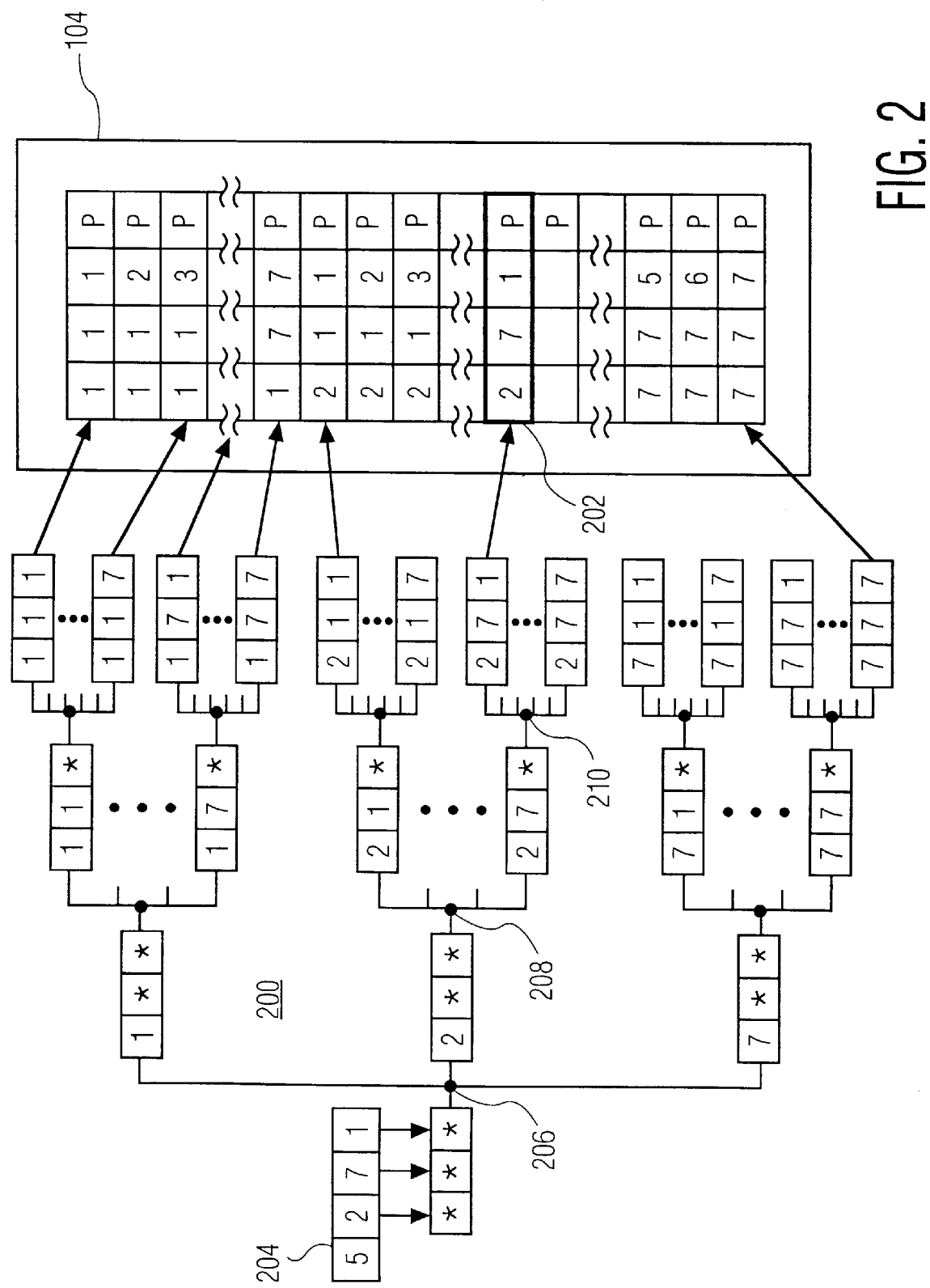
FIG. 2 is a diagram illustrating the lexicographically organized data base.

FIG. 2 is a diagram to illustrate the lexicographic organization of reference sequences and the carrying out of a query in a tree 200. For the sake of simplicity it is assumed that each of the ordered sets represents a reference sequence as stored and that each set has three elements. Each element is represented by an integer in the range from "one" to "seven". An element represents a scale degree or a ratio of successive scale degrees in a sequence as explained above. Only set 202 has been assigned a reference numeral among the lexicographically arranged sets stored in memory 104 in order to not obscure the drawing. Each of the sets has a different pointer, indicated by a letter "P".

Assume that an input data 204 represents a sequence of normalized scale degrees having the values: 5, 2, 7 and 1, respectively. The reference sequences are normalized to the scale degree "5". That is, a more complete reference sequence as stored should have begun with a "5". However, if all reference sequences were stored beginning with the same "5", the "5" at the begin would not contribute to discriminating between different reference sequences and only waste storage space. Therefore, the "5" as normalizing agent for the reference sequences is left out when the latter is stored in memory 104. The "5" is also left out from the input sequence in order to carry out the query. Accordingly, the query starts with an input sequence 2,7,1. A first node 206 in tree 200 leads to all reference sequences whose ordered sets start with a "2". A next, second node 208 leads to all references sequences whose ordered sets start with "2,7". A third node 210 leads to the reference sequence represented by the ordered set "2,7,1". Accordingly, there is a match between the input data and the reference data. Pointer "P" associated with stored set "2,7,1" is used by retrieval engine 108 to retrieve from memory 102 the bibliographic information item or items corresponding to reference sequence "2,7,1".

The MIDI (Musical Instrument Digital Interface) protocol can be used to provide a standardized means to provide music as digital electronic data. The normalizing of the input sequence to the predetermined scale degree can be accomplished in real time by proper data processing and is known in the art, e.g., from toys that change the pitch of the user's voice.

A similar procedure is followed if the elements in the ordered sets represent ratios of pairs of successive musical notes in the reference sequence. The input data are then to be put into the same format: an ordered set of ratios. The first element is then not discarded. The MIDI protocol can be used to convert an input sequence of music notes into an input sequence of ratios in real-time.

Alternatively, or supplementarily, the input data comprises rhythm information about a musical theme. The rhythm information comprises the time signature (meter) and the accentuations of the theme. The time signature determines the number of beats to the measure. The accentuation determines which beat gets an accent and which one does not.

In the invention, rhythmic accentuation patterns are used as input data in order to retrieve bibliographic information and/or a sample of the pre-recorded musical theme. For example, the user enters the rhythmic accentuation pattern into the system as a substantially monotonic sequence of accentuated and unaccentuated sounds through humming or manipulating a particular key of a keyboard, or drumming the rhythm with his or her fingers. The input data is then represented by, e.g., a sequence of peaks of varying height in the time domain. The relative distances between successive peaks represent the temporal aspects of the pattern and the heights represent the accentuations in the pattern. The pattern is assumed to repeat itself. The input data is processed as a two-dimensional array. One dimension represents the time sequence of peaks, such as: 10110101010101100 etc. The "1" represents the occurrence of a peak, the "0" the absence. A single "0" represents the shortest time interval that is needed to characterize the rhythm. If the rhythm is more complicated, i.e., if there are shorter and longer time periods between successive peaks, the shorter time period is taken to be the base unit. That is, the time stamping is related to the shortest time period characterizing the pattern, thus normalizing the pattern. The other dimension relates to the relative intensity of the peaks. The intensity levels are, for example, assigned a "high" or a "low". A query then proceeds as follows. The user enters the rhythmic pattern into the system. The pattern is converted into the string of "1"'s and "0"'s as specified above. Once the repetitive character is determined the pattern is a finite digital word. The reference sequences are digital words and are, again, ordered lexicographically. This enables the system to find one or more matching reference words upon receiving an input word. The system then pursues the query by finding the matching distribution of the accentuations within the reference words thus retrieved. Alternatively, the system could provide some bibliographic information regarding all of the matching reference words thus retrieved, leaving it to the user to determine whether the results provided show the accentuations

I claim:

1. An information processing system comprising:

first memory means storing a data base having respective bibliographic information items corresponding with respective ones of multiple musical themes;

second memory means for storing respective reference data representing respective reference sequences of reference musical components of respective ones of the musical themes;

an input for receiving an input data representative of an input sequence of input musical components;

retrieval means coupled to the input and to the first and second memory means for providing a particular bibliographic information item upon finding a match between a particular one of multiple reference data and the input data.

2. The system of claim 1, wherein:

each respective one of the input musical components comprises a respective input musical note; and each respective one of the reference musical components comprises a respective reference musical note.

3. The system of claim 2, wherein the multiple musical themes as represented by the reference sequences are uniformly normalized with regard to one and the same predetermined scale degree.

4. The system of claim 3, wherein:

each respective one of the reference data comprises a respective ordered set of elements;

a position of a specific element and a value of the specific element in the respective ordered set are determined by a position and scale degree of a specific one of the reference musical notes in the respective reference sequence; and the reference data are organized lexicographically in the second memory means.

5. The system of claim 2, wherein:

the second memory means stores the respective reference sequences as respective series of ratios between pairs of successive scale degrees of the reference musical notes; and the input receives the input data representative of an input sequence of ratios between pairs of successive scale degrees of the input musical notes.

6. The system of claim 5, wherein:

each respective one of the reference data comprises a respective ordered set of elements;

a position of a specific element and a value of the specific element in the respective ordered set are determined by a position and a magnitude of the ratio of scale degrees of a specific pair of the reference musical notes in the respective reference sequence; and the reference data are organized lexicographically in the second memory means.

7. The system of claim 1, wherein:

each reference musical component specifies the presence or absence of a reference beat; and each input musical component specifies the presence or absence of an input beat.

8. The system of claim 7, wherein each respective one of the reference musical components is represented as a digital word; and the digital words are organized lexicographically in the second memory means.

9. A memory module comprising:

first memory means storing a data base having respective bibliographic information items corresponding with respective ones of multiple musical themes;

second memory means for storing respective reference data representing respective reference sequences of reference musical components of respective ones of the musical themes and for storing pointers that link a specific one of the reference data to a specific one of the bibliographic information items.

10. The module of claim 9, wherein:

each respective one of the reference musical components comprises a respective reference musical note; and the multiple musical themes as represented by the reference sequences are uniformly normalized with regard to one and the same predetermined scale degree.

11. The module of claim 10, wherein:

each respective one of the reference data comprises a respective ordered set of elements;

a position of a specific element and a value of the specific element in the respective ordered set are determined by a position and scale degree of a specific one of the musical notes in the respective reference sequence; and the reference data are organized lexicographically in the second memory means.

12. The module of claim 10, wherein:

each respective one of the reference data comprises a respective ordered set of elements;

a position of a specific element and a value of the specific element in the respective ordered set are determined by a position and magnitude of a ratio of scale degrees of a specific pair of the musical notes in the respective reference sequence; and the reference data are organized lexicographically in the second memory means.

13. The module of claim 9, wherein:

each reference musical component specifies the presence or absence of a reference beat;

each respective one of the reference musical components is represented as a digital word; and the digital words are organized lexicographically in the second memory means.

14. A method of creating a music data base, the method comprising:
- storing in a memory respective bibliographic information items corresponding with a respective one of multiple musical themes;
- storing, lexicographically, in the memory respective reference sequences of reference musical components representative of respective ones of the musical themes; and
- providing respective pointers for linking a respective one of the reference sequences to a respective one of the bibliographic information items.

15. A method of enabling interacting with an information processing system, the system comprising:
- first memory means storing a data base having respective bibliographic information items corresponding with respective ones of multiple musical themes;
- second memory means for storing respective reference data representing respective reference sequences of musical notes of respective ones of the musical themes, wherein
  - the reference sequences are uniformly normalized with regard to one and the same predetermined scale degree;
- an input for receiving an input data representative of an input sequence of further musical notes; and
- retrieval means coupled to the input and to the first and second memory means for providing a particular bibliographic information item upon finding a match between a particular one of multiple reference data and the input data; the interacting comprising:
- normalizing the input sequence to the predetermined scale degree.

16. A method of enabling interacting with an information processing system, the system comprising:
- first memory means storing a data base having respective bibliographic information items corresponding with respective ones of multiple musical themes;
- second memory means for storing respective reference data representing respective reference sequences of musical notes of respective ones of the musical themes, wherein the respective reference sequences are stored as respective series of ratios between pairs of successive scale degrees of musical notes;
- an input for receiving an input data representative of an input sequence of further musical notes; and
- retrieval means coupled to the input and to the first and second memory means for providing a particular bibliographic information item upon finding a match between a particular one of multiple reference data and the input data; the interacting comprising:
- providing the input data representative of an input sequence of ratios between pairs of successive scale degrees of the further musical notes.

* * * * *